(12) United States Patent
Binger

(10) Patent No.: US 6,990,604 B2
(45) Date of Patent: Jan. 24, 2006

(54) VIRTUAL STORAGE STATUS COALESCING WITH A PLURALITY OF PHYSICAL STORAGE DEVICES

(75) Inventor: Norman Binger, Maple Grove, MN (US)

(73) Assignee: Storage Technology Corporation, Louisville, CO (US)

(*) Notice: Subject to any disclaimer, the term of this patent is extended or adjusted under 35 U.S.C. 154(b) by 630 days.

(21) Appl. No.: 10/034,767

(22) Filed: Dec. 28, 2001

(65) Prior Publication Data

US 2003/0126518 A1   Jul. 3, 2003

(51) Int. Cl.
G06F 11/00       (2006.01)
(52) U.S. Cl. ................... 714/6; 714/8; 714/48
(58) Field of Classification Search ............ 714/6, 714/8, 48
See application file for complete search history.

(56) References Cited

U.S. PATENT DOCUMENTS

| | | | |
|---|---|---|---|
| 5,717,850 A | 2/1998 | Apperley et al. | |
| 6,038,631 A | 3/2000 | Suzuki et al. | |
| RE36,989 E | 12/2000 | White | |
| 6,202,134 B1 | 3/2001 | Shirai | |
| 6,647,516 B1 * | 11/2003 | Rust et al. | 714/48 |
| 6,647,517 B1 * | 11/2003 | Dickey et al. | 714/48 |
| 6,658,590 B1 * | 12/2003 | Sicola et al. | 714/6 |
| 6,772,376 B1 * | 8/2004 | Merkin et al. | 714/48 |
| 6,782,492 B1 * | 8/2004 | Nakaso | 714/42 |

* cited by examiner

*Primary Examiner*—Robert Beausoliel
*Assistant Examiner*—Timothy M. Bonura
(74) *Attorney, Agent, or Firm*—Brooks Kushman P.C.

(57) ABSTRACT

Error messages generated when accessing more then one physical storage device are handled by coalescing the status from each accessed physical storage device. A controller receives a virtual storage request from a computing device specifying a virtual data access. The virtual data access includes a plurality of blocks, each block associated with one of at least two target physical storage devices. An access sequence associating one target storage device with each block in the received virtual storage access request is determined. At least one physical access request is sent to each target storage device. At least one error message is received from a target storage device, each error message having an error type. An error response is determined based on the error message type and on the access sequence.

29 Claims, 7 Drawing Sheets

VIRTUAL STORAGE STATUS COALESCING WITH A PLURALITY OF PHYSICAL STORAGE DEVICES

BACKGROUND OF THE INVENTION

1. Field of the Invention

The present invention relates to virtual storage systems supporting a plurality of physical storage devices.

2. Background Art

Computing systems may include one or more computing devices capable of accessing a plurality of physical storage devices. These storage devices may support one or more of a variety of media types including magnetic disk, magnetic tape, optical disk, optical tape, and the like. Computing devices may directly access physical storage. Such an access would typically provide a sequential listing of blocks to be written to or read from the physical storage device. These blocks may or may not be actually stored on the physical device in the sequential order specified. A controller, which may or may not be part of the computing device, interprets the access request and attempts to access the requested blocks.

The controller may encounter several types of errors when attempting to access physical storage. A communication error occurs when the physical storage device does not respond to a physical access request. This may occur because the physical storage device is off-line, is busy, is inoperative, or is otherwise unavailable. An access error occurs if the physical storage device is responding but the requested block cannot be accessed. Access errors may occur because the block is damaged, is deleted, is protected, or the like. Typically, the controller returns a status indication to a requesting computing device. The status message reflects whether the access was successful or not and if an error occurred, the error type. In the case of a read operation, data read prior to the error may also be returned by the controller.

A virtual storage system may be implemented to remove many of the storage details from computing devices accessing stored data. Typically, a controller implementing virtual storage presents the view of a single virtual storage device to the computing device. The controller may physically maintain data for a request placed by the computing device on many physical storage devices of the same or different types. The controller may also provide a variety of support functions such as maintaining volume tables, providing automatic backup and restore services, load balancing, compression, encryption, defragmentation, error detection and correction, and the like.

One problem with virtual storage is in handling error messages. A logical request placed by a computing device to access a virtual storage device may require the access of more then one physical storage devices to fulfill the request. Problems arise with how to handle error messages generated by one or more physical storage devices.

SUMMARY OF THE INVENTION

The present invention alleviates difficulties in handling error messages generated when accessing more then one physical storage device by coalescing the status from each accessed device.

A virtual storage system is provided. The system includes a computing device accessing virtual storage and a plurality of physical storage devices. A controller receives a virtual storage request from the computing device specifying a virtual data access. The virtual data access includes a plurality of blocks, each block associated with one of at least two target physical storage devices. An access sequence associating one target storage device with each block in the received virtual storage access request is determined. At least one physical access request is sent to each target storage device. At least one error message is received from a target storage device, each error message having an error type. An error response is determined based on the error message type and on the access sequence. Error message types may include communication errors and access errors.

In an embodiment of the present invention, the error response includes terminating the virtual storage access if the received error type is a communication error.

In another embodiment of the present invention, the error response includes terminating each physical access request corresponding to a block in the access sequence later then a problematic block. A problematic block is a block the attempted access of which generates at least one error message.

In yet another embodiment of the present invention, the error response includes an indication of the first block in the access sequence the access of which generates an error message.

A method of servicing a virtual storage request placed by a computing device is also provided. An access sequence associating one target storage device with each block in a virtual storage request is determined. At least one physical access request is sent to each target storage device. At least one error message is received. Each error message has one of a plurality of error types. An error response is determined based on the error type for at least one error message and on the access sequence.

A method of servicing a virtual storage request placed to a virtual storage device is also provided. The virtual storage request includes a logical sequence of blocks stored on more then one physical storage devices represented by the virtual storage device. At least one physical storage request is placed to each of the physical storage devices. Each physical storage request requests access to at least one of the blocks stored on the physical storage device targeted by the physical storage request. A response is received from each targeted physical storage device corresponding to each physical storage request. Each response indicates success or error, the error response indicating an error type. For each error response, a determination is made as to whether or not the error type is an access error. The access error indicates the targeted physical storage device could not access a problematic block. If the error type is an access error, all active storage requests later in the logical sequence then the problematic block are cancelled.

A virtual storage controller for servicing a virtual storage request placed to a virtual storage device is also provided. The virtual storage request includes a logical sequence of blocks stored on a plurality of physical storage devices. The virtual storage controller cancels any request to access blocks later in a logical sequence then a problematic block, the access of which generates an access error. The virtual storage cancels all requests to access blocks after receiving a communication error from any physical storage device.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
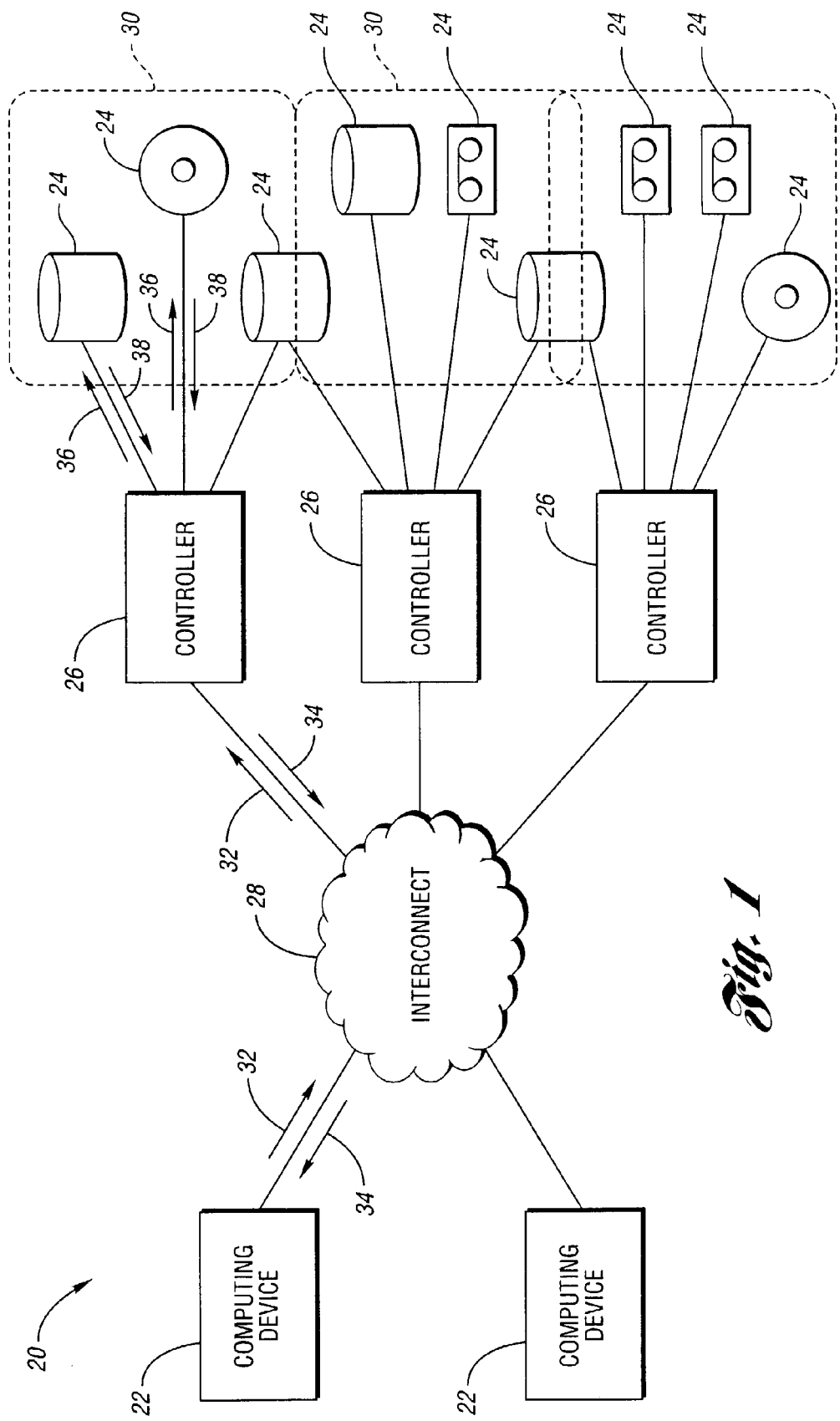
FIG. 1 is a block diagram illustrating a virtual storage system according to an embodiment of the present invention.

Referring to FIG. 1, a block diagram illustrating a virtual storage system according to an embodiment of the present invention is shown. A virtual storage system, shown generally by 20, includes one or more computing devices 22 which may be, for example, computers. Virtual storage system 20 also includes a plurality of physical storage devices 24 each of which typically supports magnetic or optical disk or tape. Each physical storage device 24 is supported by at least one controller 26. Computing devices 22 and controllers 26 communicate through interconnect 28, which may be a local area network (LAN), wide area network (WAN), storage area network (SAN), or the like. Controller 26 forms one or more virtual storage device 30, each encompassing a plurality of physical storage devices 24. Controller 26 presents virtual storage device 30 to computing device 22. Thus, controller 26 alleviates many of the storage access responsibilities which otherwise must be accomplished by computing device 22.

Computing device 22 issues virtual access request 32 to controller 26. Virtual access request 32 may include, may be preceded by, or may be followed by data if the access request is for a write operation. Controller 26 provides virtual access response 34 in replying to access request 32. Virtual access response 34 contains status information regarding the success of the access request and may also contain, may be preceded by, or may be followed by data if virtual access request 32 was for a read operation.

If virtual access request 32 specifies a virtual data access, virtual access request 32 will typically specify a plurality of blocks. Each block is associated with one physical storage device 24 in virtual storage device 30. The association may be static or dynamic depending on the implementation of controller 26 and other characteristics of virtual storage system 20. Controller 26 determines an access sequence associating one target physical storage device 24 with each block in the received virtual storage access request 32. Controller 26 sends at least one physical access request 36 to each target storage device 24. Target storage device 24 responds with physical access response 38 which contains status and may contain data for a read access. Physical access response 38 may be an error message specifying an error type. If so, controller 26 determines an error response as virtual access response 34 based on the error message type and on the access sequence.

Figure 2:
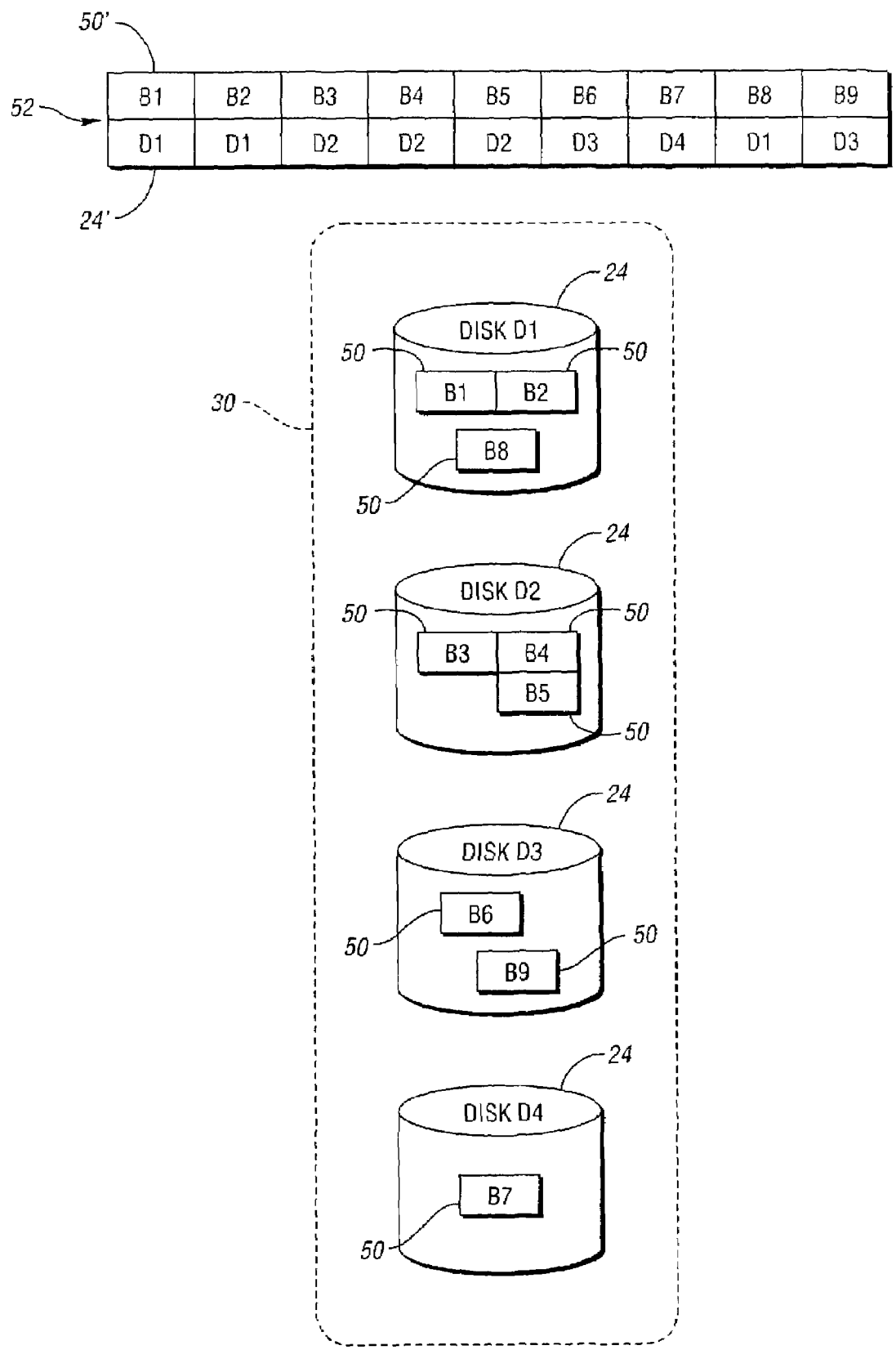
FIG. 2 is a schematic diagram illustrating a virtual storage access request according to an embodiment of the present invention.

Referring now to FIG. 2, a schematic diagram illustrating a virtual storage access request according to an embodiment of the present invention is shown. Each virtual storage device 30 includes a plurality of physical storage devices 24. This may include a plurality of homogenous storage devices 24, a mixture of types of storage devices 24, storage device 24 supporting multiple partitions, and the like. Each physical storage device 24 holds data as a plurality of blocks 50. Virtual access request 32 specifies a sequence of blocks 50. This sequence represents the order in which computing device 22 is sending or expects to receive blocks 50. This sequence need not be ordered or contiguous with regards to the manner in which blocks 50 are physically stored on physical storage devices 24.

Controller 26 receives virtual access request 32 specifying blocks 50 stored in virtual storage device 30. Controller 26 determines an access sequence, shown generally by 52, associating each block 50' with target physical storage device 24' containing block 50'. Controller 26 then attempts to access each target physical storage device 24 listed in access sequence 52. Target physical storage devices 24 may be accessed in any order, simultaneously, or in any combination of these. One or more blocks may be specified in each access request. Multiple access requests may be outstanding at any time to each physical storage device 24. Controller 26 receives physical access responses 38 from each physical storage device 24 indicating the success or failure of the requested physical storage operation.

In the case of failure, an error message type is included. One type of error, a communication or physical error, occurs if target physical storage device 24 does not properly respond to physical access request 36. This may occur if physical storage device 24 is inoperative, off-line, busy, protected, or the like. A second error type, an access error, occurs if physical storage device 24 is communicating properly with controller 26 but cannot access the requested block 50. Access errors may occur if block 50 is damaged, missing, protected, or the like. Controller 26 coalesces physical access responses 38 from target physical storage devices 24 to generate virtual access response 34.

Figure 3:
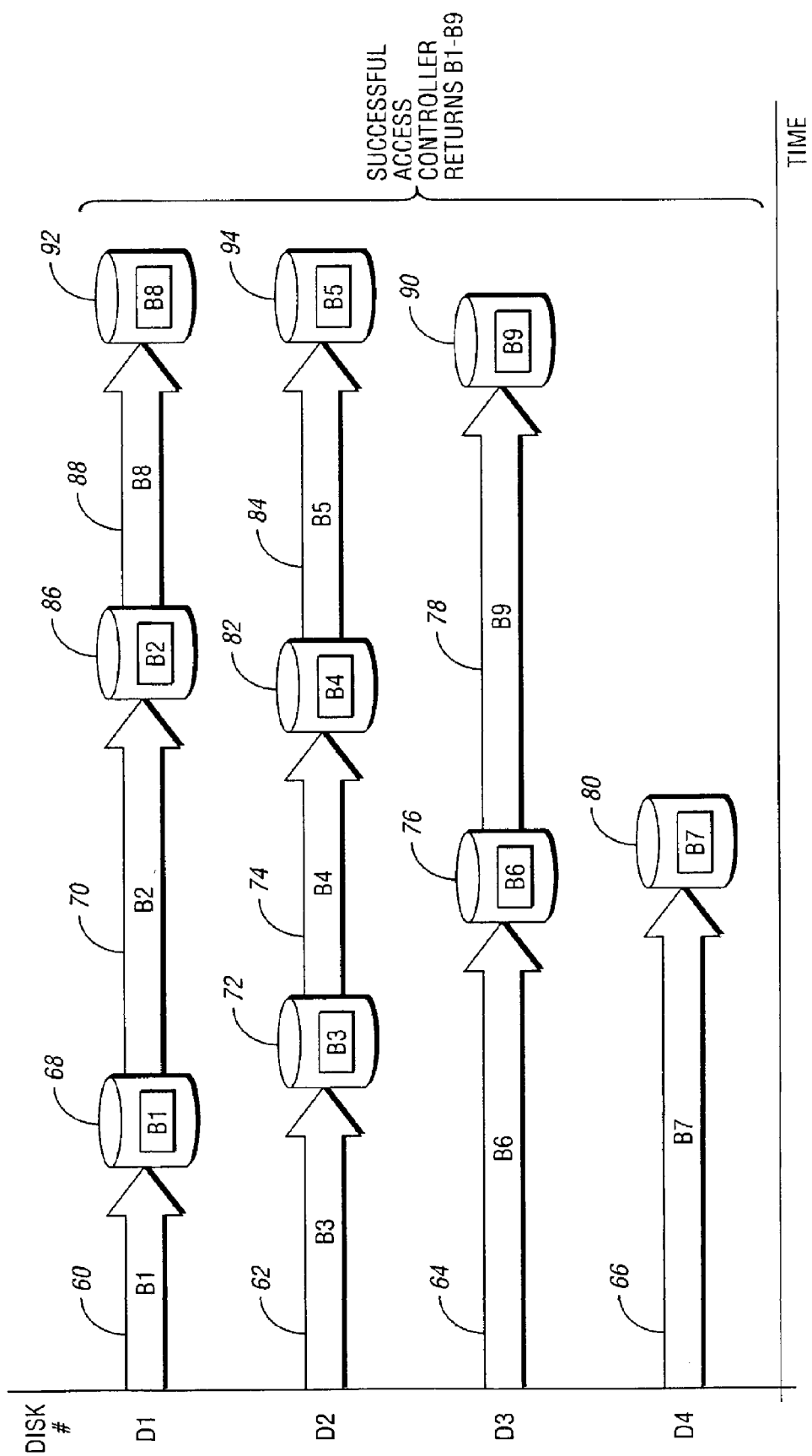
FIG. 3 is a schematic diagram illustrating a successful virtual storage access according to an embodiment of the present invention.

Referring now to FIG. 3, a schematic diagram illustrating a successful virtual storage access according to an embodiment of the present invention is shown. In this and the following examples, a virtual read request is illustrated using access sequence 52 of FIG. 2. In particular, controller 26 attempts to read blocks B1, B2 and B8 from disk D1; read blocks B3-B5 from disk D2; read blocks B6 and B9 from disk D3; and read block B7 from disk D4.

In the example illustrated, controller 26 places block B1 access request 60 to disk D1, block B3 access request 62 to disk D2, block B6 access request 64 to disk D3, and block B7 access request 66 to disk D4. These requests may be placed simultaneously, sequentially in any order, or any combination. Block B1 is first received by controller 26 at time 68. Controller 26 then issues block B2 access request 70 to disk D1. Upon receiving block B3 at time 72, controller 26 issues block B4 access request 74 to disk D2. Upon receiving block B6 at time 76, controller 26 issues block B9 access request 78 to disk D3. Controller 26 receives block B7, the only block on disk D4, at time 80. Controller 26 receives block B4 at time 82 and issue B5 access request 84 to disk D2. Controller 26 receives block B2 at time 86 and issues block B8 access request 88 to disk D1. Blocks B9, B8 and B5 are received by controller 26 at times 90, 92 and 94, respectively. Controller 26 places blocks B1 through B9 in the order requested in virtual access request 32. Controller 26 then sends requesting computing device 22 successful virtual access response 34 together with blocks B1 though B9.

Figure 4:
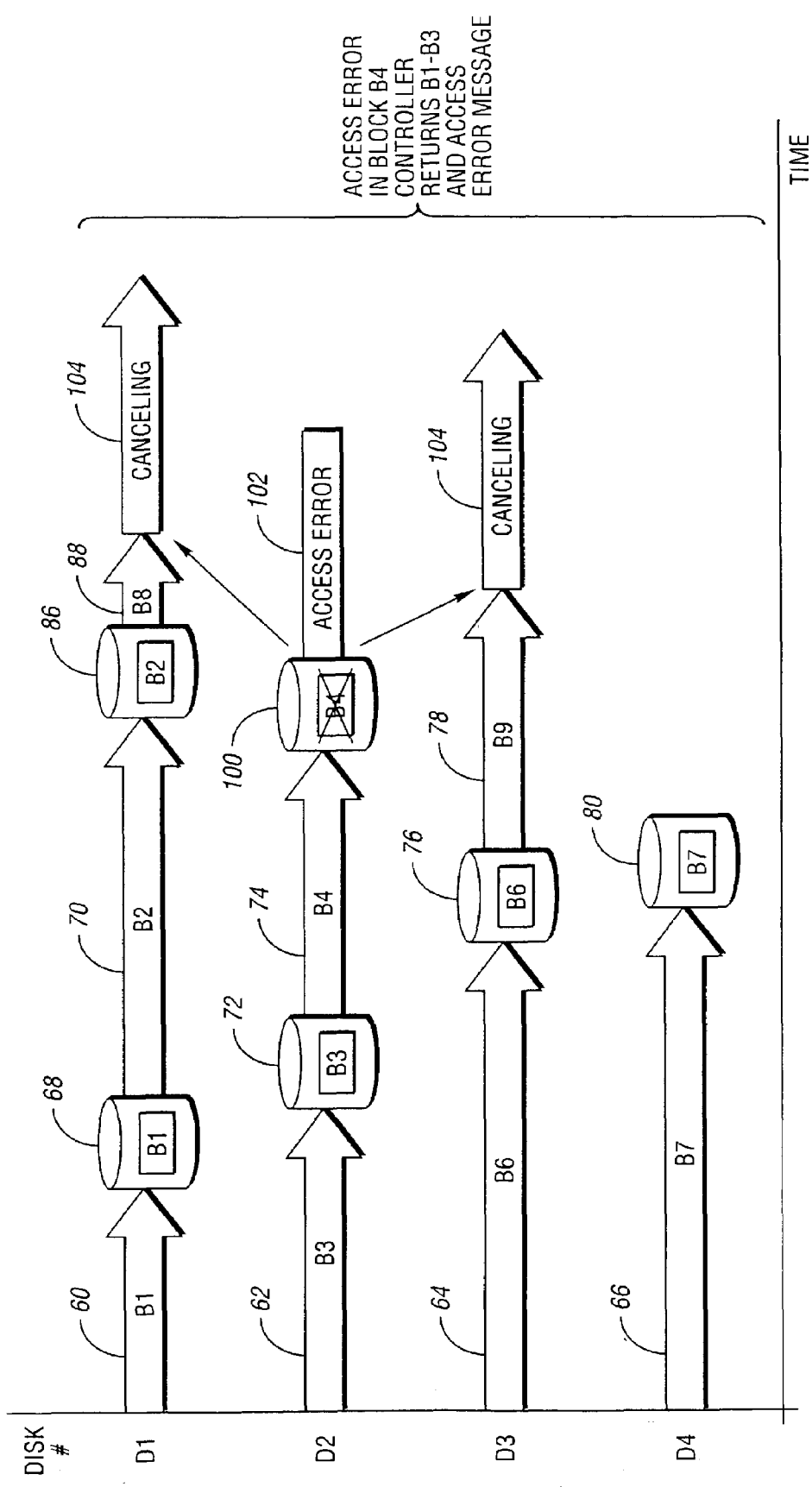
FIG. 4 is a schematic diagram illustrating a virtual storage access generating an access error according to an embodiment of the present invention.

Referring now to FIG. 4, a schematic diagram illustrating a virtual storage access generating an access error according to an embodiment of the present invention is shown. In this example, block B4 on disk D2 is a problematic block. In particular, block B4 cannot be read from disk D2. Thus, the read operation outlined in FIG. 3 proceeds until time 100 when controller 26 receives access error 102 from disk D2. In response to access error 102, controller 26 terminates physical access requests 78 and 88 corresponding to blocks B8 and B9, respectively, which are later in access sequence 52 then problematic block B4. Controller 26 sends cancelling messages 104 to disks D1 and D3 or simply disregards any data subsequently returned by disks D1 and D3 to controller 26. Controller 26 assembles blocks B1 through B3, blocks prior then problematic block B4 in access sequence 52. Controller 26 then forwards blocks B1 through B3 to requesting computing device 22 together with virtual access response 34 indicating an access error at block B4. Thus, computing device 22 receives substantially the same information from controller 26 as would have been received if computing device 22 was accessing a single physical storage device 24 instead of virtual storage device 30.

Figure 5:
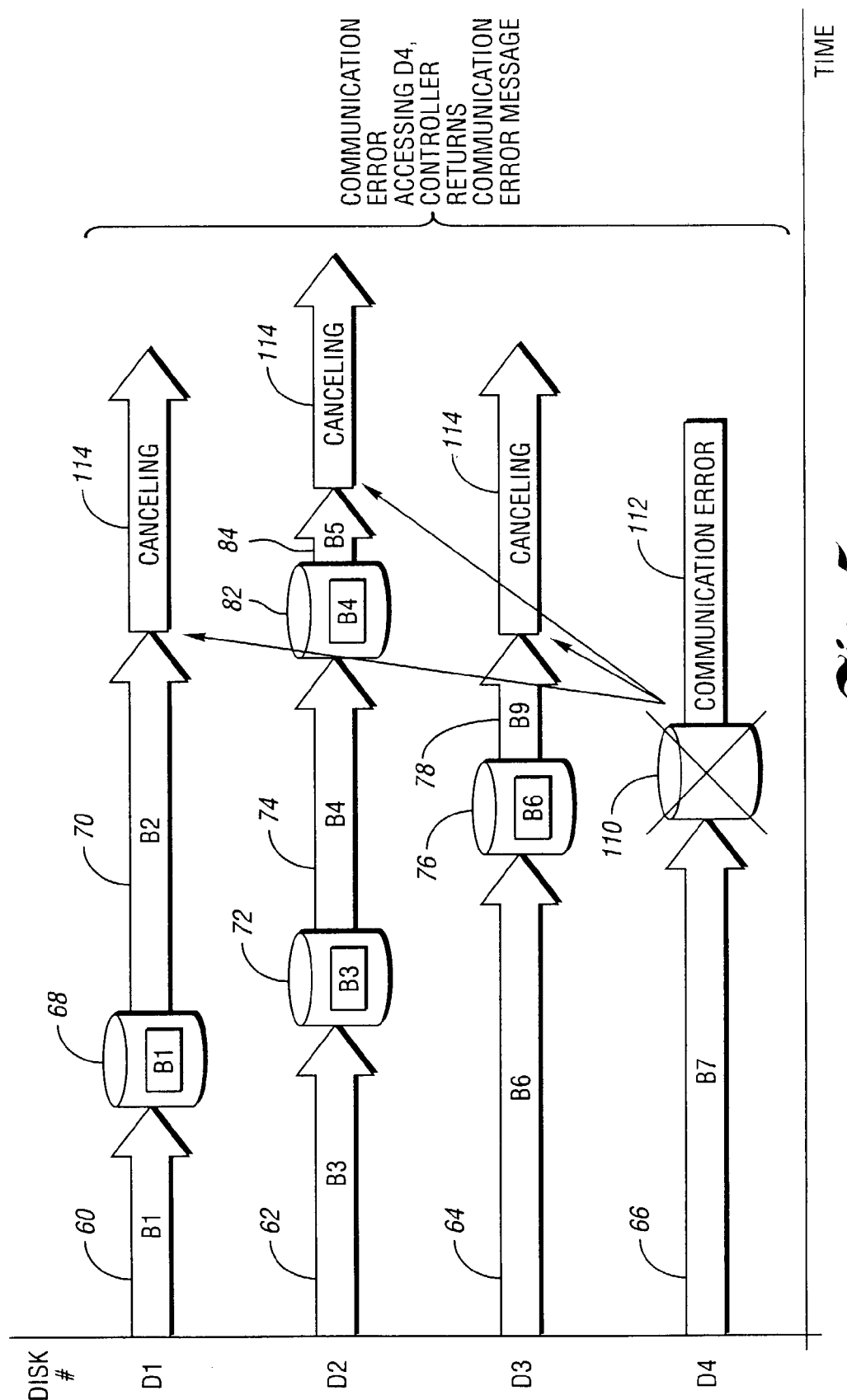
FIG. 5 is a schematic diagram illustrating a virtual storage access generating a communication error according to an embodiment of the present invention.

Referring now to FIG. 5, a schematic diagram illustrating a virtual storage access generating a communication error according to an embodiment of the present invention is shown. The virtual read operation proceeds as explained with regards to FIG. 3 until time 110 when controller 26 determines disk B4 has a communication error by receiving communication error message 112. Communication error message 112 may be received from disk D4 or may be generated by a timeout within controller 26 or by other means. Upon receiving communication error 112, controller 26 sends cancelling messages 114 to remaining disks D1 through D3 cancelling all data accesses. Controller 26 then sends virtual access response 34 to requesting computing device 22 indicating a communication failure in virtual storage device 30.

Figure 6:
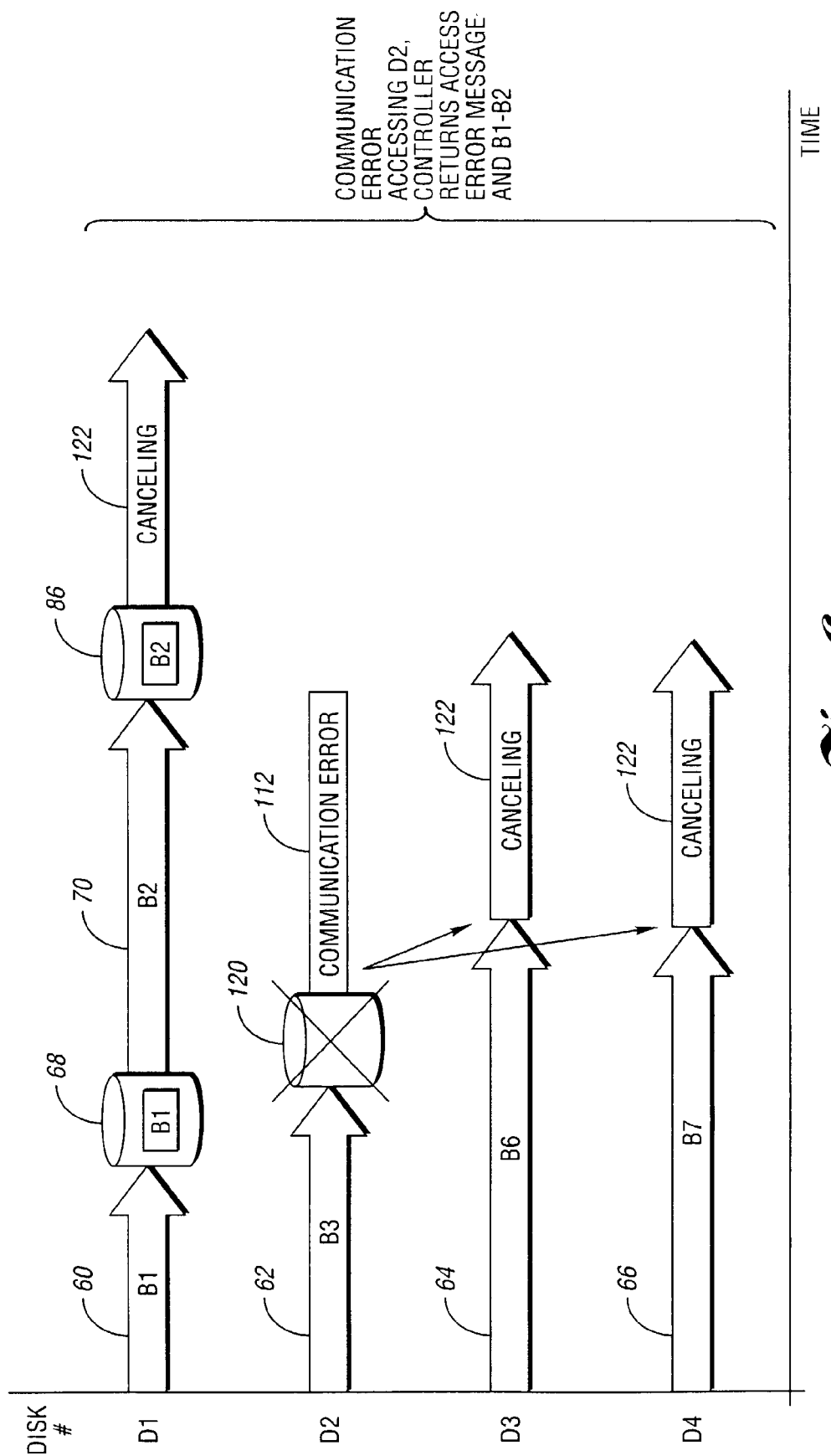
FIG. 6 is a schematic diagram illustrating a virtual storage access generating a communication error according to an embodiment of the present invention.

Referring now to FIG. 6, a schematic diagram illustrating a virtual storage access generating a communication error according to another embodiment of the present invention is shown. The virtual read operation proceeds as indicated with regards to FIG. 3 above until time 120 when controller 26 receives communication error message 112 indicating a communication error with disk D2. Controller 26 sends cancelling message 122 stopping access to disk D3 and D4. However, B2 access request 70 is allowed to continue until block B2 is returned at time 86. Controller 26 then cancels block B8 access request 88 if already sent to disk D1, otherwise controller 26 fails to send block B8 access request 88.

In this embodiment, controller 26 halts access to all blocks 50 later in access sequence 52 then problematic block B3 but continues accessing blocks 50 earlier in access sequence 52 then problematic block 50. Controller 26 returns blocks B1 and B2 to requesting computing device 22 together with an access error in virtual access response 34. Thus, computing device 22 perceives virtual storage device 30 to have experienced an access error while attempting to access block B3.

Figure 7:
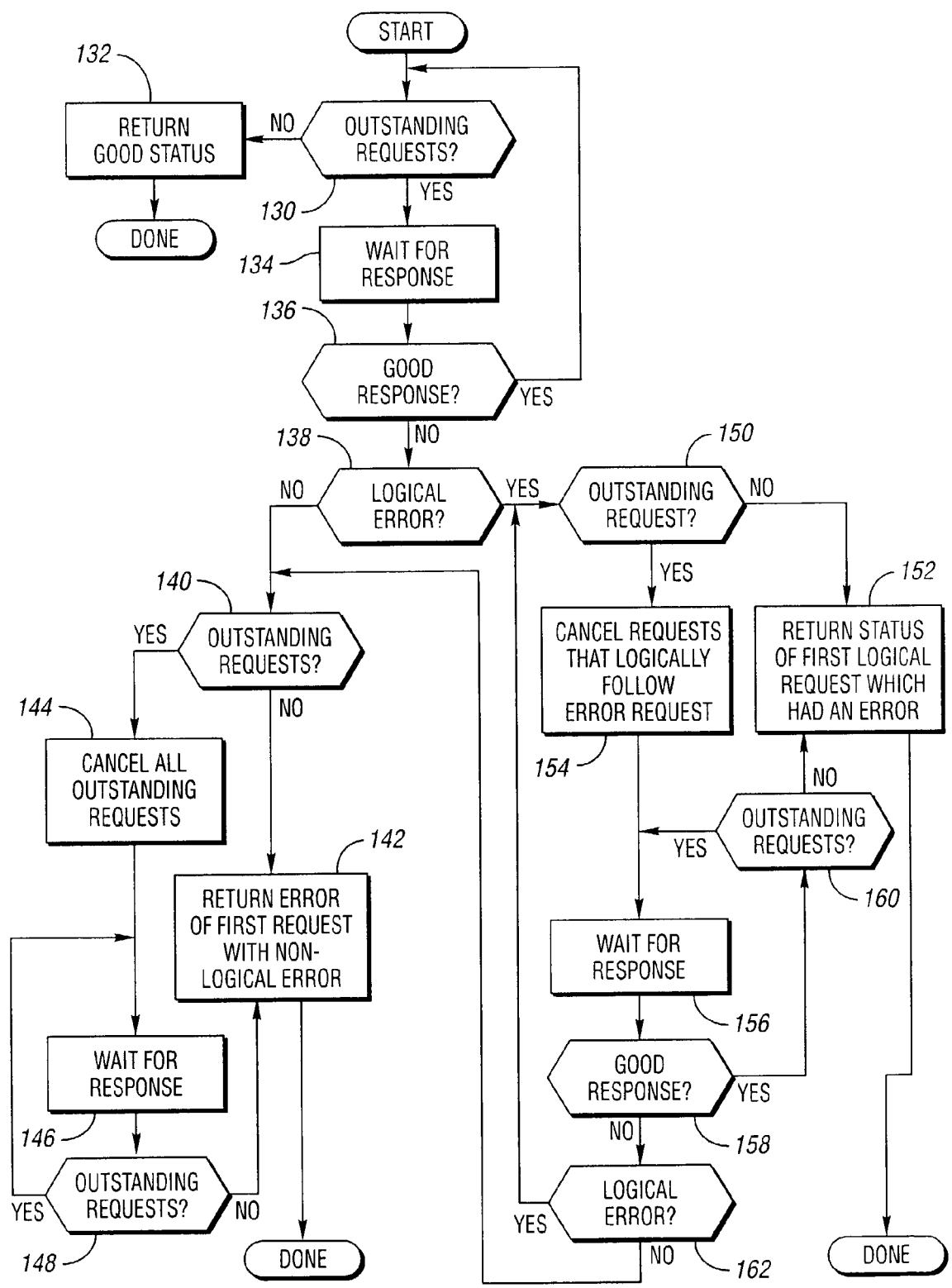
FIG. 7 is a flow diagram illustrating a method of servicing a virtual storage request according to an embodiment of the present invention.

Referring now to FIG. 7, a flow diagram illustrating a method of servicing a virtual storage request according to an embodiment of the present invention is shown. As will be appreciated by one of ordinary skill in the art, the operations illustrated are not necessarily sequential operations. Further, operations may be implemented by software, hardware, or a combination of both. The present invention transcends any particular implementation and aspects are shown in sequential flow chart form for ease of illustration.

A check is made to determine if any physical access requests are outstanding in block 130. If not, a successful status message is returned by controller 26 in block 132. If any requests are still outstanding, controller 26 waits for a response in block 134. A check is made as to whether or not the response from physical device 24 is good, as in block 136. If the response is free from error, a check for outstanding requests is made, as in block 130.

If an erroneous response was received by controller 26, a check is made in block 138 to determine if the error was a logical or access type error or whether the error was a physical or communication type error. If the error was not a logical error, a check is made to determine if there are any outstanding requests to physical storage devices 24 in block 140. If no outstanding requests remain, controller 26 returns an error indicating problematic block 50 which is first in access sequence 52 resulting from a non-logical error. If outstanding requests remain, all outstanding requests are cancelled in block 144. Controller 26 waits for responses in block 146 and checks again for outstanding requests in block 148. If any outstanding requests remain controller 26 continues to wait as in block 146. If no outstanding requests remain, controller 26 returns an error message including problematic block 50 occurring first in access sequence 52 corresponding to a non-logical error.

If a logical error was received in block 138, a check is made in block 150 to determine if controller 26 has any outstanding requests to physical storage devices 24. If not, controller 26 returns the status of the first problematic block 50 occurring in access sequence 52 which had an error, as in block 152. If any outstanding requests remain, all requests that logically follow the request generating the error, as determined by access sequence 52, are cancelled in block 154. Controller 26 waits for responses from physical storage devices 24 in block 156. A check is made in block 158 to determine if the response was a good response. If so, a check is made to determine if any outstanding requests remain in block 160. If no outstanding requests remain, controller 26 returns the status of the first logical request generating an error based on access sequence 52. If outstanding requests remain controller 26 waits for a response as in block 156. If the check for a good response made in block 158 determines that an error was received by controller 26, a check is made in block 162 to determine if the error was a logical error. If so, a check is made to determine remaining outstanding requests as in block 150. If not, a check is made to determine if any outstanding requests remain as in block 140.

While embodiments of the invention have been illustrated and described, it is not intended that these embodiments illustrate and describe all possible forms of the invention. Rather, the words used in the specification are words of description rather then limitation, and it is understood that various changes may be made without departing from the spirit and scope of the invention.

What is claimed is:

1. A virtual storage system comprising:
a computing device accessing virtual storage;
a plurality of physical storage devices; and a controller in communication with the computing device and the plurality of physical storage, the controller operative to
(a) receive a virtual storage access request from the computing device specifying a virtual data access, the virtual data access comprising a plurality of blocks, each of the plurality of blocks associated with one of at least two target physical storage devices, the target physical storage devices comprising at least a subset of the plurality of physical storage devices;
(b) determine an access sequence associating one target storage device with each block in the received virtual storage access request;
(c) send at least one physical access request to each target storage device;
(d) receive at least one error message from at least one target storage device, each error message having an error type; and
(e) determine an error response based on the error message type and on the access sequence, the error response determination including terminating each physical access request corresponding to a block in the access sequence later then a problematic block, the problematic block one of the plurality of blocks an attempted access of which generates at least one error message.

2. A virtual storage system as in claim 1 wherein received error message types comprise communication error and access error.

3. A virtual storage system as in claim 1 wherein the determined error response comprises terminating the virtual storage access if the received error type comprises a communication error.

4. A virtual storage system as in claim 1 wherein the virtual storage access comprises a read operation from the computing device, the controller returning to the computing device blocks in the access sequence prior to the problematic block.

5. A virtual storage system as in claim 1 wherein the error response includes an indication of the first block in the access sequence the access of which generates an error message.

6. A virtual storage system comprising:
a computing device accessing virtual storage;
a plurality of physical storage devices; and
a controller in communication with the computing device and the plurality of physical storage, the controller operative to
(a) receive a virtual storage access request from the computing device specifying a virtual data access, the virtual data access comprising a plurality of blocks, each of the plurality of blocks associated with one of at least two target physical storage devices, the target physical storage devices comprising at least a subset of the plurality of physical storage devices;
(b) determine an access sequence associating one target storage device with each block in the received virtual storage access request;
(c) send at least one physical access request to each target storage device;
(d) receive at least one error message from at least one target storage device, each error message having an error type; and
(e) determine an error response based on the error message type and on the access sequence;
wherein the determined error response comprises terminating each physical access request corresponding to a block in the access sequence later then a problematic block, the problematic block one of the plurality of blocks an attempted access of which generates a communication error.

7. A virtual storage system as in claim 6 further comprising returning an indication of an access error to the computing device.

8. A virtual storage system comprising:
a computing device accessing virtual storage;
a plurality of physical storage devices; and
a controller in communication with the computing device and the plurality of physical storage, the controller operative to
(a) receive a virtual storage access request from the computing device specifying a virtual data access, the virtual data access comprising a plurality of blocks, each of the plurality of blocks associated with one of at least two target physical storage devices, the target physical storage devices comprising at least a subset of the plurality of physical storage devices;
(b) determine an access sequence associating one target storage device with each block in the received virtual storage access request;
(c) send at least one physical access request to each target storage device;
(d) receive at least one error message from at least one target storage device, each error message having an error type; and
(e) determine an error response based on the error message type and on the access sequence;
wherein the determined error response comprises terminating each physical access request corresponding to a block in the access sequence later then a problematic block, the problematic block one of the plurality of blocks an attempted access of which generates an access error.

9. A method of servicing a virtual storage request placed by a computing device, the virtual storage request specifying a plurality of blocks, the blocks distributed between at least two physical target storage devices, the method comprising:
determining an access sequence associating one target storage device with each block in the virtual storage request;
sending at least one physical access request to each target storage device;
receiving at least one error message, each error message sent from one target storage device, each error message having one of a plurality of error types; and
determining an error response based on the error type for at least one error message and on the access sequence, wherein a first problematic block in the access sequence is determined as the first occurring block in the access sequence the attempted access of which returned an error message and an indication of the first problematic block is returned to the computing device placing the virtual storage request.

10. A method of servicing a virtual storage request as in claim 9 wherein the error types comprise a communication error and an access error.

11. A method of servicing a virtual storage request as in claim 9 Wherein the error message has a communication error type indicating the target storage device sending the error message is unavailable, the error response comprising terminating each physical access request for all target storage devices.

12. A method of servicing a virtual storage request placed by a computing device, the virtual storage request specifying a plurality of blocks, the blocks distributed between at least two physical target storage devices, the method comprising:
- determining an access sequence associating one target storage device with each block in the virtual storage request;
- sending at least one physical access request to each target storage device;
- receiving at least one error message, each error message sent from one target storage device, each error message having one of a plurality of error types; and
- determining an error response based on the error type for at least one error message and on the access sequence;
- wherein the error message has an access error type indicating the target storage device cannot access a problematic block, the error response comprising terminating each physical access request for any block in the access sequence after the problematic block.

13. A method of servicing a virtual storage request as in claim 12 wherein the virtual storage request is a read request, the error response further comprising sending to the computing device all blocks in the access sequence before the problematic block.

14. A method of servicing a virtual storage request placed by a computing device, the virtual storage request specifying a plurality of blocks, the blocks distributed between at least two physical target storage devices, the method comprising:
- determining an access sequence associating one target storage device with each block in the virtual storage request;
- sending at least one physical access request to each target storage device;
- receiving at least one error message, each error message sent from one target storage device, each error message having one of a plurality of error types; and
- determining an error response based on the error type for at least one error message and on the access sequence;
- wherein the error message has a communications error type, the error response comprising terminating each physical access request for any block in the access sequence after the problematic block.

15. A method of servicing a virtual storage request as in claim 14 wherein the virtual storage request is a read request, the error response further comprising sending to the computing device all blocks in the access sequence before the problematic block.

16. A method of servicing a virtual storage request placed by a computing device, the virtual storage request specifying a plurality of blocks, the blocks distributed between at least two physical target storage devices, the method comprising:
- determining an access sequence associating one target storage device with each block in the virtual storage request;
- sending at least one physical access request to each target storage device;
- receiving at least one error message, each error message sent from one target storage device, each error message having one of a plurality of error types; and
- determining an error response based on the error type for at least one error message and on the access sequence, wherein determining the error response includes
- determining as a first problematic block the first block in the access sequence the access attempt of which generated an error message;
- determining the error type for the first problematic block; and
- forwarding the determined error type to the computing device placing the virtual storage request.

17. A method of servicing a virtual storage request placed by a computing device, the virtual storage request specifying a plurality of blocks, the blocks distributed between at least two physical target storage devices, the method comprising:
- determining an access sequence associating one target storage device with each block in the virtual storage request;
- sending at least one physical access request to each target storage device;
- receiving at least one error message, each error message sent from one target storage device, each error message having one of a plurality of error types; and
- determining an error response based on the error type for at least one error message and on the access sequence, wherein determining the error response includes;
- determining as a first problematic block the first block in the access sequence the access attempt of which generated an error message;
- determining the error type for the first problematic block as a communication error; and
- forwarding an access error type message to the computing device placing the virtual storage request.

18. A method of servicing a virtual storage request placed to a virtual storage device, the virtual storage request comprising a logical sequence of a plurality of blocks stored on a plurality of physical storage devices, the physical storage devices comprising the virtual storage device, the method comprising:
- placing at least one physical storage request to each of the plurality of physical storage devices, each physical storage request requesting access to at least one of the plurality of blocks stored on the physical storage device targeted by the physical storage request;
- receiving a response from each targeted physical storage device corresponding to each physical storage request, each response comprising a successful response or an error response, the error response indicating an error type;
- for each error response, determining if the error type is an access error, the access error indicating the targeted physical storage device could not access a problematic block, the problematic block requested in the corresponding physical storage request; and
- if the error type is an access error, canceling all active physical storage requests later in the logical sequence then the problematic block.

19. A method of servicing a virtual storage request as in claim 18 further comprising canceling all active physical storage requests if the error type is a communication error indicating the targeted physical storage device receiving the corresponding physical storage request is unavailable.

20. A method of servicing a virtual storage request as in claim 18 further comprising canceling any active physical storage requests later in the logical sequence then the problematic block if the error type is a communication error indicating the targeted physical storage device receiving the corresponding physical storage request is unavailable.

21. A method of servicing a virtual storage request as in claim 18 wherein the virtual storage request comprises a read request, the method further comprising forwarding to a computing device placing the virtual storage request all blocks in the logical sequence prior to the problematic block.

22. A method of servicing a virtual storage request as in claim 18 further comprising returning an error indication comprising an indication of a first problematic block, the first problematic block being the first block in the logical sequence the access of which generates an error response.

23. A virtual storage system comprising:
a plurality of physical storage devices, each physical storage device storing information as a plurality of blocks, each physical storage device responding to a failed physical access request with an error message having one of a plurality of error types; and
a controller responding to a virtual storage request for a sequence of blocks stored on at least two of the physical storage devices, the controller operative to
(a) determine an access sequence associating one physical storage device with each block in the virtual storage request,
(b) send at least one physical access request to each physical storage device listed in the access sequence,
(c) receive at least one error message from at least one of the physical storage devices in the access sequence, and
(d) determine an error response based on the error type for at least one error message and on the access sequence;
wherein a received error message has an access error type indicating the physical storage device sending the received error message cannot access a problematic block, each physical access request for any block in the access sequence after the problematic block terminated by the controller.

24. A virtual storage system as in claim 23 wherein the error types comprise a communication error and an access error.

25. A virtual storage system as in claim 23 wherein at least one received error message has a communication error type, each physical access request for all physical storage devices in the access sequence terminated by the controller.

26. A virtual storage system as in claim 23 wherein the virtual storage request comprises a read request, the controller further returning all blocks in the access sequence before the problematic block in response to the virtual storage request.

27. A virtual storage system comprising:
a plurality of physical storage devices, each physical storage device storing information as a plurality of blocks, each physical storage device responding to a failed physical access request with an error message having one of a plurality of error types; and
a controller responding to a virtual storage request for a sequence of blocks stored on at least two of the physical storage devices, the controller operative to
(a) determine an access sequence associating one physical storage device with each block in the virtual storage request,
(b) send at least one physical access request to each physical storage device listed in the access sequence,
(c) receive at least one error message from at least one of the physical storage devices in the access sequence, and
(d) determine an error response based on the error type for at least one error message and on the access sequence;
wherein a received error message has a communication error type, each physical access request for any block in the access sequence after the problematic block terminated by the controller.

28. A virtual storage system as in claim 27 wherein the virtual storage request comprises a read request, the controller further returning all blocks in the access sequence before the problematic block in response to the virtual storage request.

29. A virtual storage controller for servicing a virtual storage request placed to a virtual storage device, the virtual storage request comprising a logical sequence of a plurality of blocks stored on a plurality of physical storage devices, the virtual storage controller cancelling any requests to access blocks later in the logical sequence then a problematic block the access of which generated an access error, the virtual storage controller cancelling all requests to access blocks after receiving a communication error from any physical storage device.

* * * * *